(12) United States Patent
Johansson

(10) Patent No.: US 8,752,434 B2
(45) Date of Patent: Jun. 17, 2014

(54) FIBRE OPTICAL SYSTEM AND USE THEREOF

(75) Inventor: Håkan Johansson, Västerås (SE)

(73) Assignee: Simea Optic AB, Västerås (SE)

( * ) Notice: Subject to any disclaimer, the term of this patent is extended or adjusted under 35 U.S.C. 154(b) by 160 days.

(21) Appl. No.: 13/375,937

(22) PCT Filed: Jun. 2, 2010

(86) PCT No.: PCT/EP2010/057730
§ 371 (c)(1),
(2), (4) Date: Dec. 2, 2011

(87) PCT Pub. No.: WO2010/139738
PCT Pub. Date: Dec. 9, 2010

(65) Prior Publication Data
US 2012/0085175 A1   Apr. 12, 2012

(30) Foreign Application Priority Data
Jun. 5, 2009   (EP) .................................... 09161993

(51) Int. Cl.
G01L 9/00   (2006.01)
G02B 6/26   (2006.01)

(52) U.S. Cl.
USPC .............................. 73/705; 385/13

(58) Field of Classification Search
None
See application file for complete search history.

(56) References Cited

U.S. PATENT DOCUMENTS

| 5,657,405 | A | 8/1997 | Fujiwara |
| 2002/0162399 | A1 | 11/2002 | Esashi et al. |
| 2003/0146393 | A1* | 8/2003 | Youngner ................ 250/458.1 |
| 2007/0089524 | A1 | 4/2007 | Walchli et al. |
| 2008/0011087 | A1 | 1/2008 | Kurtz |
| 2008/0232745 | A1 | 9/2008 | Knobloch et al. |
| 2013/0206760 | A1* | 8/2013 | Susko ......................... 220/88.3 |

FOREIGN PATENT DOCUMENTS

| SE | 510449 | 2/1998 |
| WO | 8607445 A1 | 12/1986 |
| WO | 9110119 A2 | 7/1991 |
| WO | 2005/024339 | 3/2005 |
| WO | 2005/098385 | 10/2005 |

OTHER PUBLICATIONS

N.A. Riza et al: "Harsh Environments Minimally Invasive Optical Sensor Using Free-Space Targeted Single-Crystal Silicon Carbide," IEEE Sensors Journal, vol. 6, No. 3, Jun. 1, 2006, pp. 672-685.

* cited by examiner

Primary Examiner — Andre Allen
(74) Attorney, Agent, or Firm — Dilworth & Barrese, LLP

(57) ABSTRACT

A fiber optical system for pressure measurement has a pressure sensor element (4) with at least two parallel partially reflecting surfaces (5, 7), one of which is arranged on a diaphragm (6) movable with respect to another fixed said surface as a consequence of pressure differences across said diaphragm. Said surfaces are arranged so as to cause interference phenomena of light inciding substantially perpendicularly onto and reflected by the two surfaces depending upon the actual 10 distance between these surfaces. The pressure sensor element is made of material being stable at a continuous temperature up to at least 800° C. At least said diaphragm (6) of the sensor element is made of Si C, and at least a part (23) of the optical fiber (3) connecting to said sensor element is made of a material able to withstand a continuous temperature of at least 800° C.

19 Claims, 2 Drawing Sheets

FIBRE OPTICAL SYSTEM AND USE THEREOF

FIELD OF THE INVENTION AND BACKGROUND ART

The present invention relates generally to a fibre optical system for pressure measurement. However, although the invention is directed to fibre optical systems with ability to carry out pressure measurements such systems may be configured to be used to measure other physical quantities, such as temperature. Furthermore, fibre optical systems for measuring static and/or dynamic pressures are comprised.

Fibre optical systems have several advantages over systems based on electronic sensors, since transmission of signals through optical fibres is not sensitive to electromagnetic noise, so that a preferred use of such fibre optical systems for pressure measurements is where severe electromagnetic disturbances may occur. Furthermore, optical pressure sensor elements of such systems can have a higher temperature capability than corresponding electronic sensors.

The present invention relates more particularly to a fibre optical system for pressure measurement comprising
 a pressure sensor element having at least two parallel partially reflecting surfaces, one of which is arranged on a diaphragm movable with respect to another fixed said surface as a consequence of pressure differences across said diaphragm, said surfaces are arranged so as to cause interference phenomena of light inciding substantially perpendicularly onto and reflected by the two surfaces depending upon the actual distance between these surfaces,
 a light source configured to emit light,
 an optical fibre configured to receive and transmit light from said light source to said pressure sensor element in one direction and a measurement signal in the form of light reflected by said surfaces in the opposite direction, and
 an arrangement configured to receive said measurement signal and evaluate this signal so as to determine a value of a pressure at said diaphragm,
as well as use of such a system.

A fibre optical system of this type is known through for example SE 510 449 and US 2002/0003917 A1 and is accordingly based on studying interference phenomena of light inciding upon said two surfaces of a so-called Fabry-Perot cavity for determining a pressure value. These interference phenomena will then be a function of the distance separating said two surfaces and accordingly the movement of said surface on the diaphragm with respect to the other, fixed surface. Such known fibre optical systems are able to deliver reliable pressure measurements in many situations, but it is an ongoing attempt to improve such systems for making the measurements more reliable and extend the field of use of such fibre optical systems.

SUMMARY OF THE INVENTION

The object of the present invention is to provide a fibre optical system being improved in at least some aspect with respect to such systems already known.

This object is according to the invention obtained by providing such a system in which said pressure sensor element is made of a material being stable at a continuous temperature up to at least 800° C., at least said diaphragm of said sensor is made of SiC, and at least the part of said optical fibre connecting to said sensor element is made of a material able to withstand a continuous temperature of at least 800° C.

A fibre optical system having such a pressure sensor element may be used to deliver reliable pressure measurements in harsh environments, especially where the temperature is high, such as in fuel combustion processes, for example in internal combustion engines and in gas turbines. SiC is stable at temperatures being considerably higher than 800° C., such as at least in the order of 1500° C., so that the actual distance between said two surfaces of the pressure sensor element may be substantially independent of the temperature of the diaphragm in a temperature range of 1000° C.-1500° C., where this would not be the case for a diaphragm of Si. It is then preferred that the pressure sensor element is made of a material being stable at a continuous temperature up to at least 1000° C., and that said part of the optical fibre in direct connection to said sensor element is of a material able to withstand a continuous temperature of at least 1000° C.

Another advantage of having the diaphragm of the sensor made of SiC is that the Young's modulus of SiC is approximately three times higher than of Si, which makes it possible to use a fibre optical system of this type for measuring dynamic pressures changing with a high frequency and register pressure variations not possible to register with a sensor having a diaphragm of Si.

According to an embodiment of the invention substantially the entire pressure sensor element is made of SiC. This is preferred, since the high temperature properties of such a pressure sensor element will then be excellent, and the ability to obtain high accuracy measurements of high frequency pressure changes will then also be improved. It is pointed out that "made of SiC" is in this context to be interpreted to cover also the case of having any type of thin film of another material applied upon the diaphragm/pressure sensor element made of SiC.

Moreover, a pressure sensor element in a fibre optical system of this type is preferably a so-called MEM device (Micro-ElectroMechanical device).

According to another embodiment of the invention said fixed surface of the sensor is formed by a monocrystalline layer of SiC having a crystal structure in common with said diaphragm. By the transfer of the crystal structure from said layer to the diaphragm the sensor will receive a structure with very well defined properties, which is an important advantage of a sensor of this type.

According to another embodiment of the invention said pressure sensor element comprises a cavity with a top surface defining said fixed surface next to said optical fibre and a bottom defined by said diaphragm remote to said optical fibre.

According to another embodiment of the invention said cavity is closed on the diaphragm side thereof by a layer covering an opening through the diaphragm. Thus, an opening through the diaphragm may be there when creating a gap between said fixed surface and the diaphragm, whereupon this opening is closed by covering it with said layer of a material being stable at a continuous temperature up to at least 800° C., preferably also SiC, for closing the cavity on the diaphragm side.

According to another embodiment of the invention said cavity is closed and said arrangement is configured to determine a value of a static or dynamic pressure of the medium outside said cavity. The cavity has to be closed for determining a value of a static pressure outside the sensor, but it is in most cases preferred that said cavity has a channel-like opening to a medium surrounding said pressure sensor element, when a dynamic pressure of said medium is to be measured and then determined by said arrangement.

According to another embodiment of the invention said diaphragm is designed to be deformed in a zone outside said surface to be hit by light from said optical fibre when moved with respect to said fixed surface so as to keep the appearance of the reflecting surface of said diaphragm uninfluenced by such movement of the diaphragm. This means a possibility to obtain a high accuracy in the determination of said pressure value.

According to another embodiment of the invention the optical system comprises a fluorescent member arranged in the path of said light transmitted from said light source upstream said reflecting surfaces of the pressure sensor element and configured to absorb a portion of said light for resending secondary light resulting from optical excitation in the opposite direction in said optical fibre for being provided for evaluation. The presence of such a fluorescent member makes it possible to calibrate said arrangement by appropriately considering losses of light in the optical path when calculating said pressure. The status of the light transmitting fibre may also be checked by evaluating said secondary light. Said fluorescent member also opens up for other type of evaluation, which will be described further below.

According to another embodiment of the invention said fluorescent member is arranged in connection with said pressure sensor element for being exposed to the same temperature of a medium surrounding the pressure sensor element as the pressure sensor element, said fluorescent member is made of a material having a temperature dependent fluorescent property in the form of a temperature dependent spectral distribution of said secondary light or a time delay constant of the light last mentioned being temperature dependent, and the system further comprises means configured to receive said light resent from said fluorescent member and from that determine a value of the temperature of the medium surrounding the pressure sensor element. This means that the fibre optical system may also be used to measure the temperature of a medium surrounding the pressure sensor element, and it is then also possible to use the temperature information so obtained by configuring said means to send this information to said arrangement, and said arrangement is then configured to consider such temperature information when determining said pressure at said diaphragm, so that the accuracy of the pressure determination may be raised even more.

According to another embodiment of the invention said fluorescent member is made of sapphire doped by Ti. This is a suitable material to be used for the fluorescent member when this is to be arranged in connection with the pressure sensor element, since such a fluorescent member will then withstand a continuous temperature of at least 1000° C.

According to another embodiment of the invention said fluorescent member is made of a doped SiC-layer. This constitutes another advantageous way of obtaining a fluorescent member with a suitable energy level for said optical excitation creating said secondary light. Furthermore, such a member will then have excellent high temperature stability properties.

According to another embodiment of the invention said part of said optical fibre connected to said sensor element is made of sapphire, which may withstand said high temperatures.

According to another embodiment of the invention said part of said optical fibre connecting to said sensor element has a length of 1 cm-100 cm or 1 cm-10 cm. The length of the optical fibre required to be able to withstand a said continuous temperature will be located within at least one of these intervals, since such a high continuous temperature will in the intended use of the system typically not exist beyond the upper limits of these intervals. However, the optical fibre may of course be of the same material also beyond the end of said part.

According to another embodiment of the invention said optical fibre has a standard fibre part based on quartz, and the system comprises means configured to connect said standard fibre part to said part of the optical fibre connecting to said sensor element. The use of such a standard fibre part based on quartz where high temperature stability is not required does not only result in a considerable saving of costs, but the intensity of the measurement signal reaching said arrangement may by this be considerably increased, since the degree of attenuation of transmitted light is much lower in such a standard fibre than in a high temperature fibre.

According to another embodiment of the invention said connecting means comprises a lens for transferring a light beam from one of said fibre parts to the other, so that the light transmitting path may be formed by a plurality of fibre parts.

According to another embodiment of the invention said light source is a monochromatic light source, for instance a light emitting diode or a laser diode, preferably with a high coupling factor with respect to said fibre.

The invention also relates to a use of a fibre optical system according to any of the embodiments according to the present invention for pressure measurement in connection with fuel combustion processes, such as in internal combustion engines and in gas turbines, where it is possible to fully benefit from the features of such a fibre optical system.

Further advantages as well as advantageous features of the invention will appear from the following description of embodiments of the invention.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
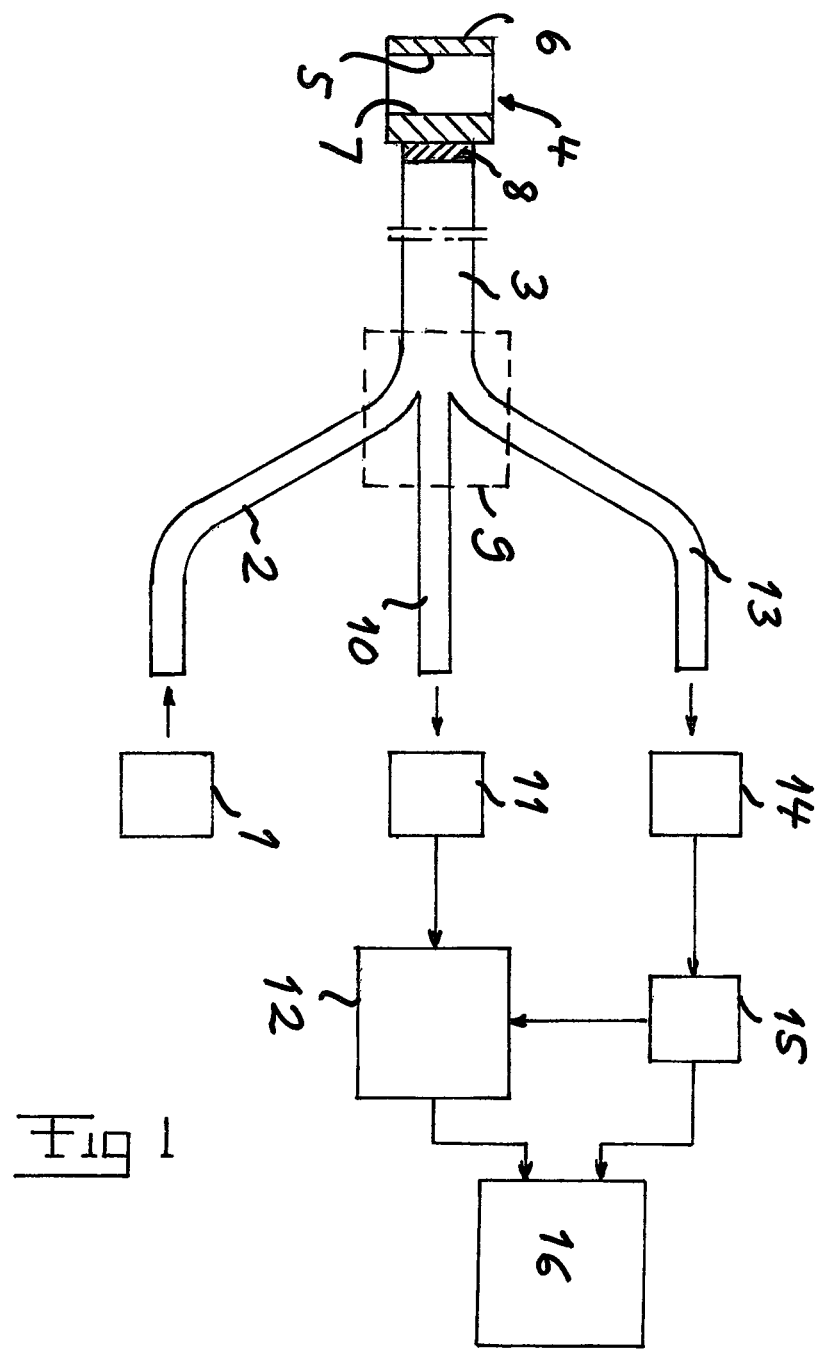
FIG. 1 is a very simplified circuit diagram illustrating a fibre optical system according to an embodiment of the present invention, FIG. 2 schematically illustrates a pressure sensor element of a fibre optical system according to a first embodiment of the present invention, FIG. 3 schematically illustrates a pressure sensor element of a fibre optical system according to a second embodiment of the invention.

FIG. 1 illustrates very schematically the general structure of a fibre optical system of the type to which the present invention pertains. The construction and way of operation of this fibre optical system will now be briefly explained, and reference is made to SE 510 449 for further explanation of a fibre optical system of this type.

The fibre optical system comprises a light source 1, such as a light emitting diode or a laser diode, emitting monochromatic light with a suitable wavelength, such as about 750 nm, which will be explained further below. The light emitted from the light source 1 is transmitted in a branch 2 of an optical fibre 3 reaching a pressure sensor element 4 having two parallel partially reflecting surfaces, one 5 of which is arranged on a diaphragm 6 movable with respect to another fixed said surface 7 as a consequence of pressure differences across the diaphragm 6. The typical distance between said surfaces 5, 7 is selected so as to cause interference phenomena of light inciding substantially perpendicularly onto and reflected by the two surfaces depending upon the actual distance between these surfaces. The distance of the two surfaces in a resting position with no pressure difference across said diaphragm is so that it is moved in a region between a valley and a peak of a signal resulting from an interference of light reflected by said fixed surface and by the surface on the diaphragm when the diaphragm is moving between extreme positions as a consequence of such pressure differences of the diaphragm. This means that the pressure across said diaphragm will be a monotone function of said distance within this measurement range.

The system also comprises a fluorescent member 8, such as a glass plate doped by ions of neodyme or another rare earth metal having fluorescent properties. The fluorescent member is arranged in the path of said light transmitted from the light source up-stream the two reflecting surfaces of the pressure sensor element and configured to absorb a portion of said light from the light source for resending secondary light resulting from optical excitation in the opposite direction in said optical fibre for being provided for evaluation. This optical excitation is resulting in a secondary light of a longer wavelength, in the case of neodyme ions about 1060 nm, than the wavelength of the light emitted by the light source 1.

The fibre optical system further comprises a beam divider 9 dividing the lights transmitted in the direction away from the pressure sensor element 4 in the optical fibre 3 in a branch 10 transmitting the light reflected by said two parallel surfaces of the pressure sensor element 4 to a detector 11 sending an electrical signal further to an arrangement 12 configured to evaluate this signal so as to determine a value of a pressure prevailing at said diaphragm. The beam divider 9 divides said secondary light emanating from the fluorescent member 8 to another branch 13 for detection and transferring to an appropriate signal by a detector 14. The detector 14 sends said signal further to means 15 configured to determine a value of the temperature of the medium surrounding the pressure sensor element, which will be possible thanks to the temperature dependent spectral distribution of said secondary light or a time delay constant of the light last mentioned being temperature dependent for the material selected for the fluorescent member 8.

The temperature determining means 15 is further configured to send information about said temperature to the arrangement 12, and the arrangement 12 is configured to consider such temperature information when determining said pressure at said diaphragm.

The means 15 and the arrangement 12 are configured to provide information about temperature and pressure to a device 16 for displaying these quantities.

Figure 2:
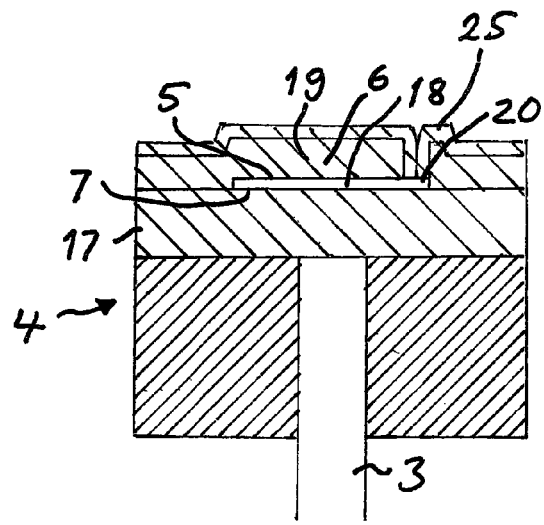

FIG. 2 schematically illustrates a pressure sensor element 4 of the fibre optical system according to the present invention. The pressure sensor element has a first layer 17 of crystalline SiC, such as of the polytype 3C, forming a top surface in the form of said fixed surface 7 of a closed cavity 18 having a bottom 19 formed by a diaphragm 6. The first layer 17 and the diaphragm 6 have a common crystal structure by a transfer of the monocrystalline structure of the first layer to the diaphragm 6. A fixed surface 7 and a movable surface 5 in the centre part of the bottom 19 in parallel with each other partially reflecting light inciding thereupon is formed in this way.

Moreover, it appears that the cavity 18 is on the diaphragm side thereof closed by a layer 25 covering an opening through the diaphragm present during the creation of the cavity.

The diaphragm 6 is designed to be deformed in a zone 20 outside the surface 5 to be hit by light from the optical fibre when moved with respect to the fixed surface. This is obtained by designing the diaphragm 6 with a diameter being substantially larger than the diameter of said surface 5, since the deformation of the diaphragm will mainly occur at the periphery thereof, where it is fixed to the rest of the sensor element structure. Also the diaphragm is made of crystalline SiC. The depth of the cavity, i.e. the distance separating the surfaces 7 and 5 is in the order of 1 μm. By having the entire pressure sensor element made of SiC, which is stable at temperatures well above 1000° C. the fibre optical system may reliably measure and determine pressures in environments in which such high temperatures reside.

Figure 3:
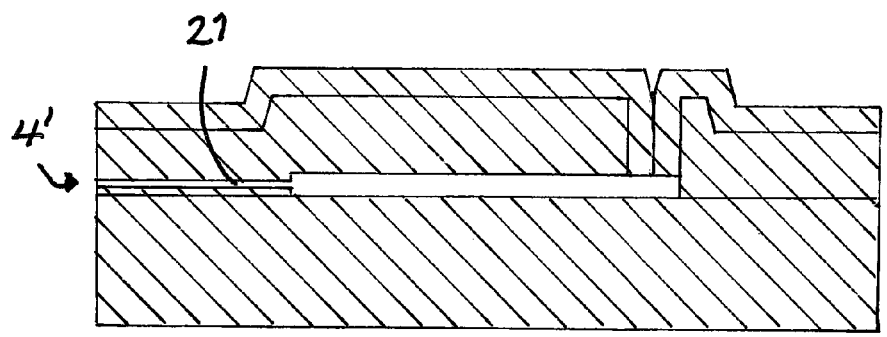

FIG. 3 illustrates schematically a pressure sensor element 4' in a fibre optical system according to another embodiment of the invention, in which this pressure sensor element differs from the one according to FIG. 2 by the fact that the cavity 18 has been provided with a channel-like opening 21 to a medium surrounding the pressure sensor element, which makes the pressure sensor element suitable for measuring dynamic pressures, i.e. varying pressures and especially pressures varying with a high frequency, since the high Young's modulus of SiC makes this possible.

Figure 4:
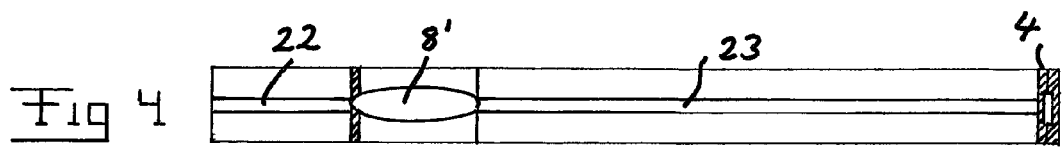
FIG. 4 is a simplified view illustrating a part of a fibre optical system according to an embodiment of the invention.
Figure 5:
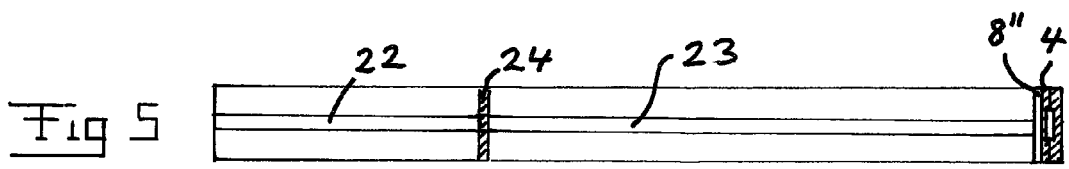
FIG. 5 is a view corresponding to FIG. 4 according to another embodiment of the invention.

FIG. 4 and FIG. 5 illustrate schematically two different ways of arranging a fluorescent member 8' and 8", respectively, in a fibre optical system according to the invention. The fluorescent member 8' is in the embodiment shown in FIG. 4 arranged in a low temperature part of the optical fibre, and this may then be made of a glass disc doped by ions of neodyme or any other rare earth metal having fluorescent properties. The member 8' is here a lens transferring light beams between a low temperature part 22 of the optical fibre formed by a standard fibre based on quartz and a high temperature part 23 of the optical fibre connecting to the pressure sensor element 4 and made of a material able to withstand a continuous temperature of at least 800° C., such as sapphire.

The embodiment according to FIG. 5 differs from the one according to FIG. 4 by the fact that the fluorescent member 8" is arranged in connection with the pressure sensor element for being exposed to the same temperature of a medium surrounding the pressure sensor element as the pressure sensor element, which means that the fluorescent member has to be made of a material able to withstand high temperatures. This is achieved by making the fluorescent member 8" of sapphire doped by Ti or a layer of doped SiC. The two parts 22 and 23 of the optical fibre are here connected by a suitable lens 24 for transferring light beams between these parts.

The invention is of course not in any way restricted to the embodiments described above, but many possibilities to modifications thereof will be apparent to a person with skill in the art without departing from the scope of the invention as defined in the appended claims.

Although it has been shown that said fixed surface for reflecting light is formed on a part of the pressure sensor element being separated from the optical fibre this fixed surface may principally be a part of the optical fibre.

The invention claimed is:
1. A fibre optical system for pressure measurement comprising
   a pressure sensor element (4) having at least two parallel partially reflecting surfaces (5, 7), one of which is arranged on a diaphragm (6) movable with respect to another fixed said surface as a consequence of pressure differences across said diaphragm, said surfaces are arranged to cause interference phenomena of light inciding substantially perpendicularly onto and reflected by the two surfaces (5, 7) depending upon the actual distance between these surfaces, a light source (1) configured to emit light, an optical fibre (3) configured to receive and transmit light from said light source to said pressure sensor element in one direction and a measurement signal in the form of light reflected by said surfaces in the opposite direction, and an arrangement (12) configured to receive said measurement signal and evaluate this signal to determine a value of a pressure at said diaphragm, wherein said pressure sensor element (4) is made of material being stable at a continuous temperature up to at least 800° C., at least said diaphragm (6) of said sensor is made of SiC, and at least the part (23) of said optical fibre (3) connecting to said sensor element is made of a material able to withstand a continuous temperature of at least 800° C., and a fluorescent member (8', 8") is arranged in the path of said light transmitted from said light source (1) up-stream said reflecting surfaces (5, 7) of the pressure sensor element (4) and configured to absorb a portion of said light from the light source for resending secondary light resulting from optical excitation in the opposite direction in said optical fibre for being provided for evaluation.

2. A fibre optical system according to claim 1, wherein substantially the entire pressure sensor element (4) is made of SiC.

3. A fibre optical system according to claim 1, wherein said pressure sensor element (4) comprises a cavity (18) with a top surface (17) defining said fixed surface next to said optical fibre and a bottom (19) defined by said diaphragm (6) remote to said optical fibre.

4. A fibre optical system according to claim 3, wherein said cavity (18) is closed and said arrangement (12) is configured to determine a value of a static or dynamic pressure of the medium outside said cavity.

5. A fibre optical system according to claim 3, wherein said cavity (18) has a channel-like opening (21) to a medium surrounding said pressure sensor element (4), and said arrangement (12) is configured to determine a value of a dynamic pressure of said medium.

6. A fibre optical system according to claim 1, wherein said diaphragm (6) is designed to be deformed in a zone (20) outside said surface (5) to be hit by light from said optical fibre when moved with respect to said fixed surface (7) to keep the appearance of the reflecting surface of said diaphragm uninfluenced by such movement of the diaphragm.

7. A fibre optical system according to claim 1, wherein said fluorescent member (8") is arranged in connection with said pressure sensor element (4) for being exposed to the same temperature of a medium surrounding the pressure sensor element as the pressure sensor element, said fluorescent member is made of a material having a temperature dependent fluorescent property in the form of a temperature dependent spectral distribution of said secondary light or a time delay constant of the light last mentioned being temperature dependent, and the system further comprises means (15) configured to receive said light resent from said fluorescent member and determine a value of the temperature of the medium surrounding the pressure sensor element.

8. A fibre optical system according to claim 7, wherein said means (15) is configured to send information about said temperature to said arrangement (12), and said arrangement is configured to consider such temperature information when determining said pressure at said diaphragm (6).

9. A fibre optical system according to claim 7, wherein said fluorescent member (8") is made of sapphire doped by Ti or a doped SiC-layer.

10. A fibre optical system according to claim 1, wherein said part (23) of said optical fibre connecting to said sensor element is made of sapphire.

11. A fibre optical system according to claim 1, wherein said part (23) of said optical fibre connecting to said sensor element has a length of 1 cm-100 cm or 1 cm-10 cm.

12. A fibre optical system according to claim 1, wherein said optical fibre has a standard fibre part (22) based on quartz, and the system comprises means (24) configured to connect said standard fibre part to said part (23) of the optical fibre connecting to said sensor element.

13. A fibre optical system according to claim 12, wherein said connecting means (24) comprises a lens for transferring a light beam from one of said fibre parts to the other.

14. Use of a fibre optical system according to claim 1 for pressure measurement in connection with fuel combustion processes, such as in internal combustion engines and in gas turbines.

15. A fibre optical system according to claim 2, wherein said pressure sensor element (4) comprises a cavity (18) with a top surface (17) defining said fixed surface next to said optical fibre and a bottom (19) defined by said diaphragm (6) remote to said optical fibre.

16. A fibre optical system according to claim 15, wherein said cavity (18) is closed and said arrangement (12) is configured to determine a value of a static or dynamic pressure of the medium outside said cavity.

17. A fibre optical system according to claim 15, wherein said cavity (18) has a channel-like opening (21) to a medium surrounding said pressure sensor element (4), and said arrangement (12) is configured to determine a value of a dynamic pressure of said medium.

18. A fibre optical system according to claim 17, wherein said diaphragm (6) is designed to be deformed in a zone (20) outside said surface (5) to be hit by light from said optical fibre when moved with respect to said fixed surface (7) to keep the appearance of the reflecting surface of said diaphragm uninfluenced by such movement of the diaphragm.

19. A fibre optical system according to claim 16, wherein said diaphragm (6) is designed to be deformed in a zone (20) outside said surface (5) to be hit by light from said optical fibre when moved with respect to said fixed surface (7) to keep the appearance of the reflecting surface of said diaphragm uninfluenced by such movement of the diaphragm.

* * * * *